Dec. 21, 1954     L. A. LA FOND     2,697,627

LIFTER FOR HOT ARTICLES

Filed July 17, 1950

*INVENTOR.*
LOUIS A. LAFOND
BY

ATTORNEY

United States Patent Office 2,697,627
Patented Dec. 21, 1954

2,697,627

LIFTER FOR HOT ARTICLES

Louis A. La Fond, Minneapolis, Minn.

Application July 17, 1950, Serial No. 174,306

1 Claim. (Cl. 294—32)

My invention relates to an improvement in a device for lifting utensils particularly of a type whereby hot pie pans, dishes, et cetera, may be easily lifted from the grill shelf of a hot oven or the like.

It is a primary object of my invention to provide a device having a series of tines or fingers having a relatively small cross section which form the object engaging portion of my device, said tines or fingers being insertable between and bypassing the rod-like elongated grill members composing a shelf of an ordinary oven and under the pan or dish resting on the grill. The fingers are secured to a back member having a handle secured thereto. As a result the hot pan or dish may be lifted from the grill members without, for example, having to force a flat member between the bottom of the pen or dish and the top surfaces of the rod-like grill members of the oven shelf. In addition, other old means of lifting a hot dish from an oven shelf include engaging the same with a hot pad clamp, or tongs which have proved very undesirable.

It is a further feature of my invention to provide an article lifter which is easily engageable under the bottom of an object resting in a grill shelf member of an oven in a new and novel manner which provides positive engagement with the underside of the object whether it be a pie pan, potatoes, casserole, cookie pan or the like.

It is an additional feature of my device to position the face ends of the outer tines or fingers of my lifting device slightly above the plane of the central tines or fingers so that an object resting on the fingers will not slide sideways of the fingers. Secured to the back member from which the fingers emanate is a handle and a stop member which prohibits an object from sliding back onto the handle.

My device replaces hot pads, spatulas, gripping tongs and similar devices for removing hot objects from an oven grill.

It is apparent that my device may be used for lifting objects from water or an outdoor grill. It may also be used as a rest for a hot object upon a table, for the fingers or tines transmit very little heat to the table and allow air to circulate between the bottom of the object and the table.

With the free ends of the outer fingers slightly above the plane of the free ends of the central fingers, a flat cookie tin may be easily engaged by placing the lifter with the central fingers beneath the cookie tin and the outer inclined fingers above the surface of the cookie tin as at point B of Figure 3, thus securely holding the tin for removal from an oven grill.

The invention will appear more clearly from the following detailed description when taken in connection with the accompanying drawings, showing by way of example a preferred embodiment of the inventive idea.

In the drawings forming part of the application:

Figure 1:
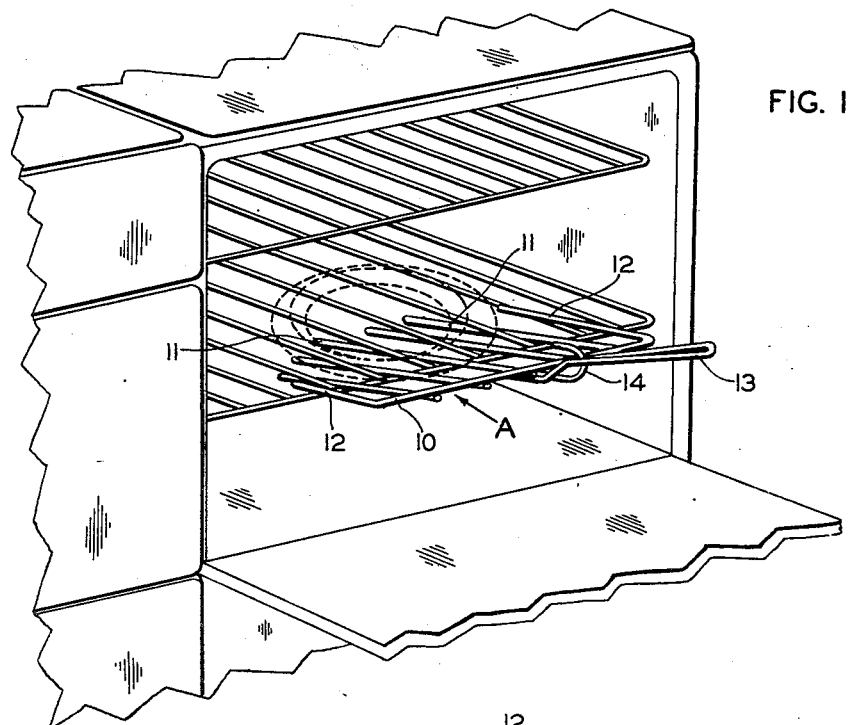
Figure 1 is a perspective view of my device being inserted between the rod-like grill members of an oven shelf and beneath a pan shown in broken lines preparatory to lifting the pan from the oven shelf.
Figure 2:
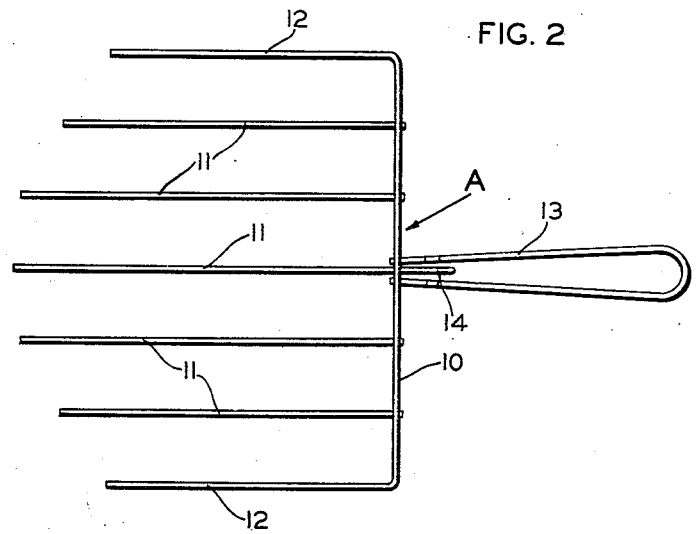
Figure 2 is a top plan view of my device.
Figure 3:
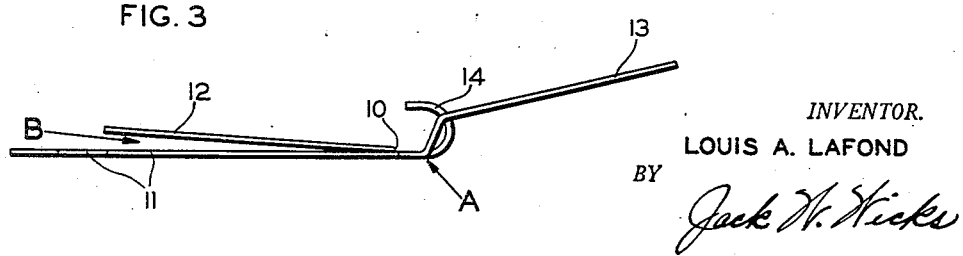
Figure 3 is a side elevational view thereof.

My utensil lifting device A is composed of a transverse base member 10 from which extend the narrow tines or finger support members 11. The fingers 11 form a platform or surface which is used to lift and support an object. The outer fingers 12 extend from base member 10 and are raised slightly on the outer free ends thereof to provide shoulders or stop members whereby objects will be retained on the fingers 11 and prohibited from sliding sidewise and off the same. The fingers 11 and 12 are formed of narrow construction so that the grill rods of an oven shelf, for example, may be bypassed thereby.

Secured to the base member 10 is the handle member 13 which may be constructed of wire, plastic, wood or any suitable material. Extending from the base member 10 is a stop member 14 which is provided to prevent pans resting on the fingers 11 from sliding backwardly and onto the handle 13. Further, the stop member 14 may be used to hang up the lifter A when not in use.

It is apparent that the fingers 11 may be formed of rods, flat members or of a channel cross section. Further the fingers 11 and 12 together with the transverse base portion 10 and the handle 13 may be case, molded or stamped in one piece from metal, plastic or any suitable material.

The fingers 11 may be formed of any length, and the ends of the outer fingers may be progressively shortened to facilitate placing the fingers alongside the grill members and beneath a pan or dish resting on the grill for lifting the same therefrom.

In using my device, the free ends of the fingers 11 are pointed downwardly slightly as the same are placed or slid between the grill rod members of an oven shelf such as illustrated in Figure 1 of the drawings, and under the object resting on the grill shelf. The fingers 11 are then brought upwardly under and in contact with the object, and the same may be lifted from the surface of the grill shelf as the fingers by-pass the rod members forming the grill shelf.

Thus with my lifter A objects may be easily and quickly removed from a grill by lifting the same therefrom without sliding anything between the bottom of the object and the upper surface of the grill members of a shelf or without clamping the object in some manner to move the same. In using my device the chance of burning the fingers and/or dropping the object being moved is reduced to a minimum.

Although my device A is illustrated as having seven tines or fingers 11, it is apparent that any number of fingers 11 may be used; that is, two or more.

The invention is not to be understood as restricted to the details set forth since these may be modified within the scope of the appended claim without departing from the spirit of scope of the invention.

Having thus described the invention, what I claim is new and desire to secure by Letters Patent is:

In a device for lifting objects, a base member, a series of widely spaced straight and rigid fingers having a small constant diameter and extending from said base member and adapted to be inserted between the members of a grill shelf with a minimum of interference, handle means secured to said base member, the outer free ends of the outer of said fingers being raised above the plane of the remaining central fingers.

References Cited in the file of this patent

UNITED STATES PATENTS

| Number | Name | Date |
|--------|------|------|
| 191,793 | Zimmerman et al. | June 12, 1877 |
| 512,162 | Cuddy | Jan. 2, 1894 |
| 844,966 | Smith | Feb. 19, 1907 |
| 865,620 | Vasconcelles | Sept. 10, 1907 |
| 1,267,778 | Leen | May 28, 1918 |
| 1,390,870 | Bittle | Sept. 13, 1921 |
| 2,345,183 | Cyr | Mar. 28, 1944 |

FOREIGN PATENTS

| Number | Country | Date |
|--------|---------|------|
| 29,434 | Australia | Oct. 7, 1930 |
| 455,162 | Great Britain | Oct. 15, 1936 |